P. J. CULHANE.
COUPLING DEVICE.
APPLICATION FILED DEC. 1, 1913.
1,233,849
Patented July 17, 1917.
2 SHEETS—SHEET 1.
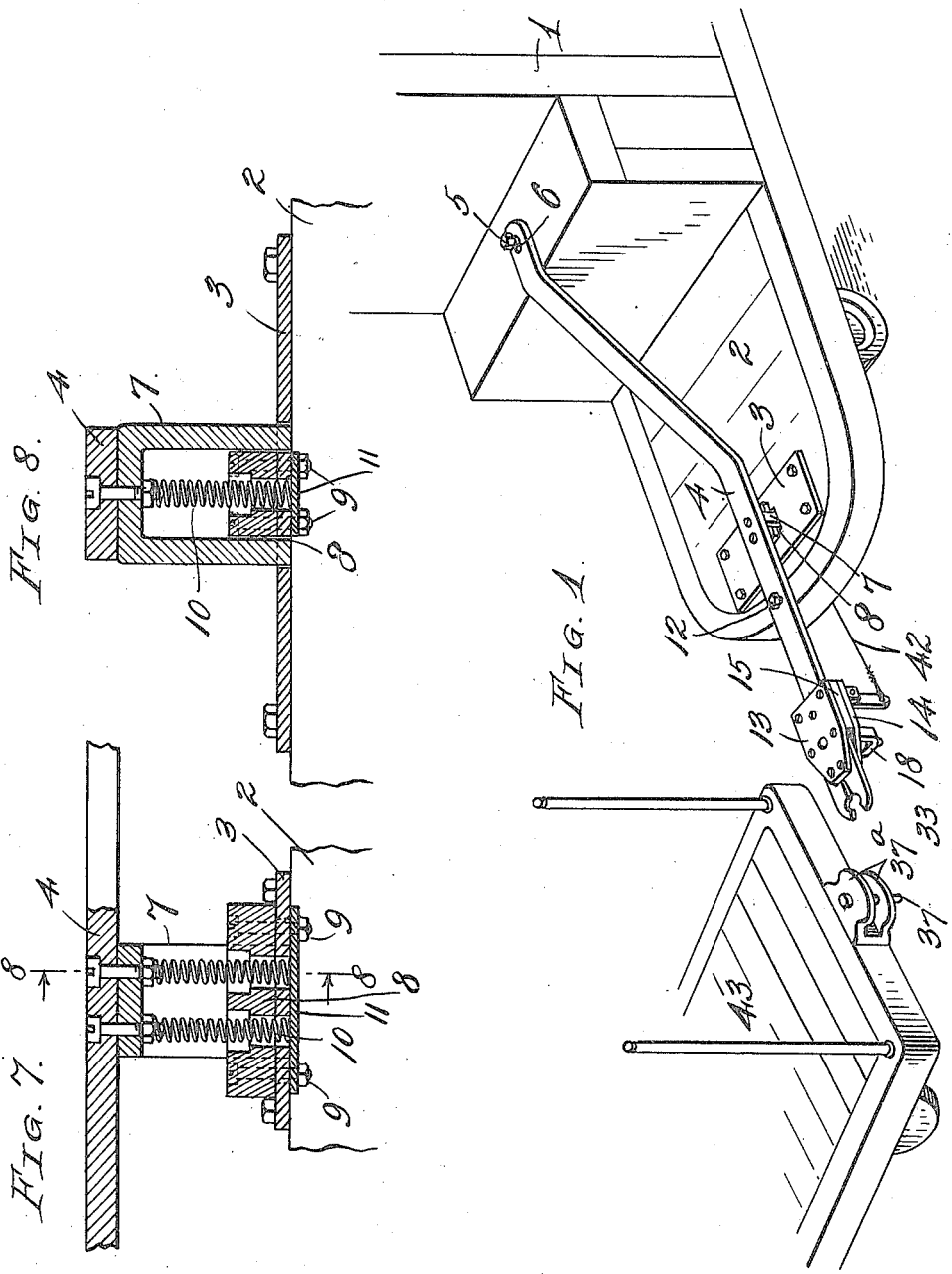
Witnesses:
A. L. Lord
R. L. Buck
Inventor.
Patrick J. Culhane
Hull & Smith
Att'ys

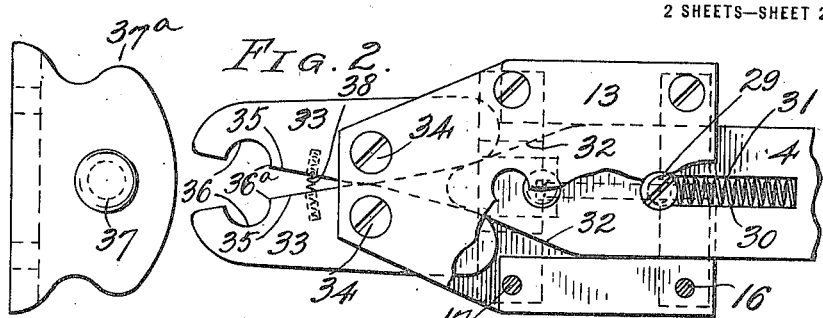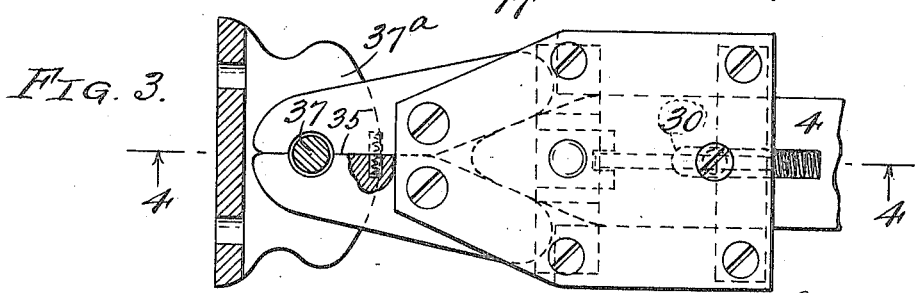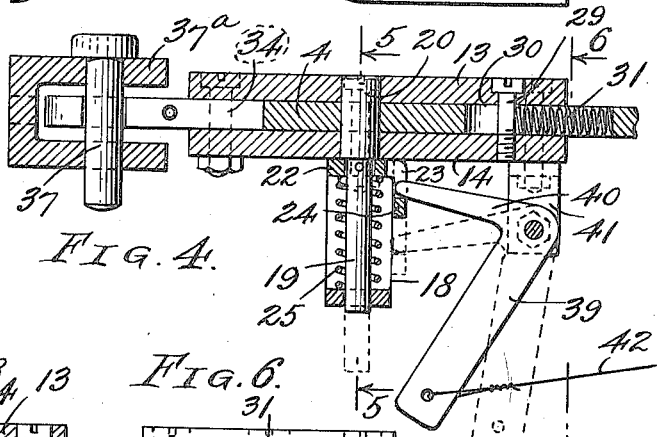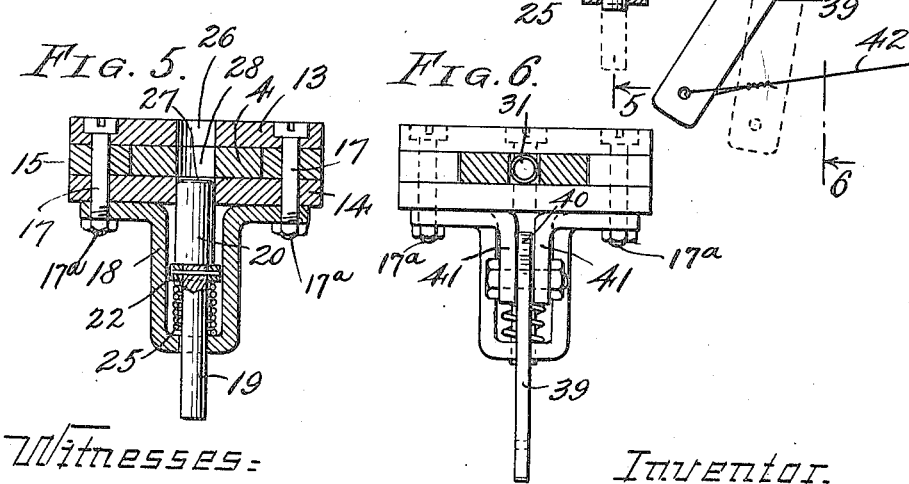

UNITED STATES PATENT OFFICE.

PATRICK J. CULHANE, OF CLEVELAND, OHIO, ASSIGNOR, BY MESNE ASSIGNMENTS, TO THE ELWELL-PARKER ELECTRIC COMPANY, OF CLEVELAND, OHIO, A CORPORATION OF OHIO.

COUPLING DEVICE.

1,233,849.     Specification of Letters Patent.     Patented July 17, 1917.

Application filed December 1, 1913. Serial No. 803,875.

*To all whom it may concern:*

Be it known that I, PATRICK J. CULHANE, a citizen of the United States, residing at Cleveland, in the county of Cuyahoga and State of Ohio, have invented a certain new and useful Improvement in Coupling Devices, of which the following is a full, clear, and exact description, reference being had to the accompanying drawings.

This invention relates to coupling devices, the embodiment shown herein being used for the purpose of connecting and disconnecting a tractor to cars or trucks, such as are used in factories for the transportation of materials. Among the objects of the invention are the provision of a coupling device which may be very conveniently operated to connect and disconnect the tractor from the car or truck; also to provide a device of this kind which may be conveniently adjusted to accommodate varying heights. Further objects of the invention are to provide a device of this character which, while simple in construction, is extremely efficient and particularly well adapted to all of the ordinary incidents of use arising within its province.

Still further objects and advantages of the invention will appear hereinafter, the invention being set forth in the claims hereto annexed and being illustrated in the drawings forming part hereof, wherein Figure 1 represents a view in perspective of the adjacent ends of a tractor and truck, the tractor being provided with my improved coupling device and the truck with a coöperating coupling pin; Fig. 2 represents a detail in plan, with parts broken away, of the coupling mechanism and the coöperating pin, the coupling device being shown in "open" position; Fig. 3 represents a similar view, showing the coupling device connected to its pin and in closed position; Fig. 4 a vertical sectional view corresponding to the line 4—4 of Fig. 3; Figs. 5 and 6 are details corresponding, respectively, to the lines 5—5 and 6—6 of Fig. 4; and Figs. 7 and 8 are details in section of the yielding support for the draw bar.

Describing by reference characters the various parts illustrated herein, 1 denotes generally a tractor, for instance, of the electric-truck type. For convenience of description, it will be assumed that the end of the tractor which carries the coupling is the "rear" end, although it will be obvious that the coupling may be used indifferently to push or to pull an attached car or truck. 2 denotes a platform at one end of the tractor, said platform having, near the rear end thereof, an apertured plate. 4 denotes a draw bar having one end connected to the tractor, by means of a bolt 5 extending through a slot 6 in said bar. The intermediate portion of the draw bar is provided with a U-shaped frame 7, the branches whereof project through the aperture of the plate 3. 8 denotes a block which is fastened to the central portions of the plate 3 and extends transversely of the frame 7, forming a guide therefor. This block is bolted to the plate 3, the bolts being shown at 9, and the block is provided with recesses to accommodate the lower ends of the springs 10, the upper ends of the springs bearing against the top of the frame 7, as shown herein, while the bottoms of the recesses may be closed by means of a plate 11. The construction afforded by the parts 7 to 11 inclusive forms a vertically yielding support for the draw bar 4. It will be apparent that the downward movement of the draw bar is yieldingly resisted by the springs 10. To prevent undue vertical movement of the draw bar, a headed bolt 12 may be employed, the body of the bolt extending through the draw bar and the lower end of the bolt being secured to the rear of the platform 2.

The outer or rear end of the draw bar carries a coupling device which will now be described:—13 denotes the upper and 14 the lower plates of a carrier, the said plates being connected and spaced by suitable side pieces 15. The top, bottom, and sides are connected by means of bolts 16 and 17, the bolts 17 being longer than the bolts 16 and having their lower ends extending through a U-shaped frame 18 and provided with nuts 17ª. This U-shaped frame 18 is perforated at the bottom to form a guide for the stem 19 of a pin 20. The stem is shown as of smaller diameter than the body of the pin 20, whereby it forms a reduced extension of said pin. The stem 19 has connected thereto an L-shaped operating arm, the upper branch 22 of such arm being pinned to the upper end of the stem 19. The other or vertical branch of this operating arm 24 is provided with a slot 23, for a purpose to be explained hereinafter. A coiled spring 25 surrounds the stem, with its lower end bearing against the bottom of the U-shaped frame 18 and its upper end bearing against the collar 22, said spring tending to hold the pin 20 elevated. The upper end of the pin is adapted to pass through alined openings 26 and 27 in the plates 13 and 14, respectively, and through an aperture 28 in the draw bar when the draw bar aperture registers with the first-mentioned apertures.

The carrier is slidably mounted on the rear end of the draw bar through a pin-and-slot connection, 29 denoting a pin anchored in the plates 13 and 14 and extending through a slot 30 in the draw bar. Interposed between the front end of this slot and the pin 29 there is a coiled spring 31 which tends to thrust the carrier rearwardly on the draw bar.

The extreme rear end of the draw bar is provided with inclined surfaces 32 which are adapted to operate upon the inclined surfaces on the adjacent ends of a pair of pivoted coupling-jaws 33. Each of these jaws is pivoted to the rear end of the carrier, bolts 34 being provided for this purpose. These jaws are so shaped that, when their front ends are spread apart by the inclined surfaces of the draw bar, the opposed faces 35 will be in contact and the jaws closed. (See Fig. 3.) Each of these opposed faces is provided with a semi-circular recess 36, which recesses are adapted to receive, when the levers are closed, a coupling pin 37 carried by the flanges 37ᵃ projecting from the car or truck which is to be moved. A spring 38 opens the jaws when their front ends are moved away from the inclined end of the draw bar. (See Fig. 2.) It will be noted that the parts are so proportioned that, when the jaw-levers are open, the distance between the front ends 36ᵃ of the recesses 36 is less than the width of the body of the pin 37. The purpose of this construction will be set forth hereinafter.

39 and 40 denote the arms of an angle-lever which is pivoted between a pair of lugs 41 depending from the carrier. The rear end of the arm 40 is adapted to engage the cross bar 24 as the lower end of the arm 39 is moved forwardly, as by the cable 42, thereby to withdraw the pin 20 from the alined apertures in the plate 13 and in the draw bar 4.

With the parts constructed as illustrated and described, the operation will be as follows:—The operator pulls upon the cord or cable 42, thereby withdrawing the pin 20 from the alined apertures in the plate 13 and the draw bar 4. Thereupon the spring 31 thrusts the carrier rearwardly on the draw bar. The spring 38 operates to spread apart the rear ends of the levers 33, opening the jaws as shown in Figs. 1 and 2. When the pin 37 strikes the front ends 36ᵃ of the recesses 36, it thrusts the carrier 13—15 and the attached parts forwardly upon the draw bar, whereupon the inclined surfaces 32 close the jaws 33 about the pin 37. As soon as the aperture 28 in the draw bar registers with the pin 20 (the operator having slackened up on the cord or cable 42) the pin 20 is thrust upwardly by its spring and locks together the carrier and the draw bar, the parts being locked in the positions indicated in Figs. 3 and 4. The truck 43 may then be transported to any desired place and, when it is desired to uncouple, it is only necessary to pull upon the cord or cable 42, which will withdraw the pin 20 from the draw bar, whereupon the spring 31 will thrust the carrier and its attached parts rearwardly, the spring 38 then opening the jaws 33.

Should the end of the truck 43 which is adjacent to the tractor be depressed (as by the application of the load thereto) making adjustment of the coupling necessary, then in order to engage the pin 37, the operator need only pull upon the cord or cable 42. This will depress the draw bar against the action of the springs 10 and enable the jaws to enter the space between the retaining flanges 37ᵃ. The cord or cable may then be slackened, and the coupling will operate in the manner described hereinbefore.

It will be observed that the top plate 13 is smooth, the various bolt heads being countersunk therein.. This facilitates the insertion of the coupling and its carrier between the plates or flanges 37ᵃ and beneath a load which may overhang the end of the truck.

Having thus described my invention, what I claim is:—

1. In a device of the character described, the combination of a draw bar, a carrier movably mounted thereon, a pair of jaws pivoted to said carrier, means whereby the said jaws may be opened and closed by relative movement between the carrier and the draw bar, and means for locking the said jaws in closed position.

2. In a device of the character described, the combination of a draw bar, a carrier movable with respect thereto, a pair of jaws pivoted to said carrier, means whereby the said jaws may be opened and closed by relative movement between the carrier and the draw bar, and means for automatically locking the said jaws in closed position.

3. In a device of the character described, the combination of a draw bar, a carrier movably mounted on said draw bar, a coupling device on the carrier, means whereby the coupling device may be brought into and out of operative relation to the object to be transported in and through relative movement between the carrier and the draw bar, and means for automatically locking the said device in such operative relation.

4. The combination, with a draw bar, of a carrier movably mounted on the draw bar, a coupling device pivotally mounted on the carrier and adapted to be brought into operative relation to the object to be transported in and through the relative movement between the carrier and the draw bar, and means adapted to automatically lock the draw bar and the carrier together when the coupling device has been brought into operative relation to the object to be transported.

5. The combination, with a draw bar, of a carrier movably mounted thereon, a coupling device pivotally and slidably supported by the draw bar and adapted to be rotated into operative relation to the article to be transported in and through the relative movement between the carrier and the draw bar, and means adapted to automatically lock the draw bar and the coupling device together when the coupling device has been brought into operative relation to the article to be transported.

6. The combination, with a draw bar, of a carrier slidably mounted thereon, a pair of coupling levers pivoted to the carrier and each having an inclined extension projecting toward coöperating inclined portions of the draw bar, means tending to hold the coupling ends of said levers in open position, means for holding the inclined extensions of said levers away from the coöperating portions of the draw bar, and locking means adapted to automatically connect the carrier and the draw bar when the carrier has been moved to a position to close the coupling levers through the engagement of their inclined surfaces with the coöperating inclined portions of the draw bar.

7. The combination, with a draw bar, of a pair of pivoted coupling levers slidable with respect to the draw bar and each having an inclined extension projecting toward coöperating inclined portions of the draw bar, means tending to hold the coupling ends of said levers in open position, means for holding the inclined extensions of said levers away from the coöperating portions of the draw bar, and means adapted to automatically connect the levers and the draw bar when the levers have been closed through the engagement of their inclined surfaces with the coöperating inclined portions of the draw bar.

8. The combination with a tractor, of a coupling device secured thereto and including a carrier movably mounted thereon, a pivoted coupling jaw on said carrier, another jaw on the carrier coöperating with the first mentioned jaw, means whereby the jaws may be closed and opened consequent upon a relative movement of the carrier and tractor, and means for automatically locking said jaws in a closed position.

9. The combination with a tractor, of a coupling device, a support therefor on the tractor, the coupling device including a pair of jaws pivotally mounted on said support and adapted to be moved longitudinally thereof, and means for closing and opening the jaws consequent upon such movement, said jaws having cavities for embracing a coupling pin, the cavities being engaged by the pin to move the jaws as the coupling device is presented thereto.

10. In a device of the character described, the combination of a draw bar, a coupling device thereon including a pair of pivoted coöperating locking jaws mounted to move longitudinally of the draw bar, means for opening and closing them consequent upon such movement, and means for locking the jaws in their engaging position.

11. The combination with a draw bar, of a pair of intermediately pivoted jaws carried by the draw bar, movable means mounted on the draw bar adapted to force the jaws closed by wedging action consequent upon a movement caused by engaging the object to be transported, spring means for normally separating the jaws, and means for automatically locking them in their closed position.

12. The combination, with a draw bar, of a pair of pivoted jaws slidably mounted on the draw bar, each jaw having a portion adapted to be engaged by the draw bar whereby said jaws may be closed by the draw bar when they are moved along said draw bar by impact against the object to be transported, means tending to open said jaws, and means for automatically locking the said jaws closed.

13. The combination, with a draw bar, of a pair of pivoted jaws slidably mounted on the draw bar, each jaw having a portion adapted to be engaged by the draw bar whereby said jaws may be closed by the draw bar when they are moved along said draw bar by impact against the object to be transported, means tending to open said jaws, and means operative by the movement of the jaws along the draw bar for automatically locking the said jaws closed.

14. The combination, with a draw bar having its end provided with oppositely beveled surfaces, of a pair of jaws pivotally supported from the draw bar and movable therealong, each lever having an operating surface adapted to be engaged by an inclined surface of the draw bar thereby to close the jaws when they are moved along the draw bar by impact against the object to be transported, means tending to hold the jaws open, means tending to hold the jaws away from the inclined portions of the draw bar, and means adapted to automatically lock the jaws closed when they are moved a predetermined distance along the draw bar by such impact.

15. The combination, with a draw bar having its ends provided with oppositely beveled surfaces, of a pair of jaws pivotally supported from the draw bar and movable therealong, each lever having an operating surface adapted to be engaged by an inclined surface of the draw bar, thereby to close the jaws when they are moved along the draw bar by impact against the object to be transported, means tending to hold the jaws open, means tending to hold the jaws away from the inclined portions of the draw bar, and means adapted to automatically lock the jaws to the draw bar when they are moved a predetermined distance along the latter by such impact.

16. The combination, with a draw bar having its end provided with oppositely inclined portions, of a jaw carrier slidably mounted on said bar, a pair of jaws pivoted to the carrier and each having an inclined extension adapted to coöperate with an incline on the end of the draw bar thereby to close the jaws when the carrier is moved therealong, a spring adapted to hold the carrier with the inclined portions of the jaws out of engagement with the coöperating portions of the draw bar, means tending to hold the jaws open, the carrier and the draw bar having openings which are adapted to register when the carrier is moved to jaw-closing position, a pin mounted in one of the aforesaid openings, a spring tending to thrust the pin into the other opening when the carrier and draw bar openings are in alinement, and means for withdrawing the pin to permit the carrier to move along the draw bar, thereby to open the jaws.

17. The combination, with a draw bar, of a jaw carrier slidably mounted on said bar, a pair of jaws pivoted to the carrier, means carried by the draw bar and adapted to engage the jaws to close the same when the carrier is moved therealong, means tending to hold the carrier with the jaws out of closing engagement with the draw bar, means tending to hold the jaws open, the carrier and the draw bar having openings which are adapted to register when the carrier is moved to jaw-closing position, a pin mounted in one of the aforesaid openings, means tending to thrust the pin into the other opening when the carrier and draw bar openings are in alinement, and means for withdrawing the pin to permit the carrier to move along the draw bar thereby to open the jaws.

18. The combination, with a draw bar having its end portion oppositely inclined, of a carrier slidably mounted on the draw bar, a pair of jaws pivoted to the carrier and each having an inclined operating portion adapted to engage one of the inclines on the end of the draw bar thereby to close the jaws and each jaw having a recess in the face which is presented toward the opposite jaw, the ends of the recesses which are adjacent to the draw bar being closer together when the jaws are open than the opposite ends and the distance between such adjacent ends of the recesses being less than the width of the coupling pin on the article to be transported, whereby said pin is adapted to engage such ends of the recesses, a spring tending to move the carrier rearwardly along the draw bar, means tending to hold the jaws open, means adapted to automatically lock the carrier to the draw bar when the said carrier shall have been moved along the draw bar a sufficient distance by the impact of the coupling pin to cause the closing of the jaws, and means whereby such locking connection may be broken.

19. The combination, with a draw bar, of a pair of jaws pivotally and slidably supported with respect to the draw bar and adapted to be closed through such sliding movement, each jaw having in the face which is presented toward the opposite jaw a recess, the ends of the recesses which are adjacent to the draw bar being closer together when the jaws are open than the opposite ends and the distance between such adjacent ends of the recesses being less than the width of the coupling device which said jaws are intended to grasp, whereby said device is adapted to engage such ends of the recesses, means tending to move the jaws rearwardly along the draw bar, means tending to hold the jaws open, means adapted to automatically lock the jaws together and to the draw bar when they shall have been moved along the draw bar a sufficient distance by the impact of the coupling device to cause the closing of the jaws, and means whereby such locking connection may be broken.

20. The combination, with a tractor, of a draw bar secured to the tractor, a vertically yielding support for the draw bar, a coupling device carried by the draw bar, and common means adapted to open the coupling device and to move the rear end of the draw bar against the action of its yielding support.

21. The combination, with a tractor, of a draw bar carried thereby, a vertically yielding support for the draw bar, a coupling device carried by the draw bar, and a flexible operating device connected to the coupling device and adapted to open the same and to depress the draw bar against the action of the yielding support.

In testimony whereof, I hereunto affix my signature in the presence of two witnesses.

PATRICK J. CULHANE.

Witnesses:
BRENNAN B. WEST,
RICHARD S. SPENCER.